United States Patent [19]
Plochocka et al.

[11] Patent Number: 5,225,524
[45] Date of Patent: Jul. 6, 1993

[54] PROCESS FOR RENDERING AMINO-GROUP-CONTAINING POLYMER SOLUTIONS SUBSTANTIALLY ODORLESS

[75] Inventors: Krystyna Plochocka, Scotch Plains; Jenn S. Shih, Paramus; Jui-Chang Chuang, Wayne, all of N.J.

[73] Assignee: ISP Investments Inc., Wilmington, Del.

[21] Appl. No.: 907,982

[22] Filed: Jul. 2, 1992

[51] Int. Cl.$^5$ .............................. C08F 6/00; C08F 6/06
[52] U.S. Cl. ................................. 528/482; 528/486; 528/487; 523/102
[58] Field of Search ................ 528/482, 486, 487; 523/102

[56] References Cited

U.S. PATENT DOCUMENTS

| | | | |
|---|---|---|---|
| 2,893,982 | 7/1959 | Campbell et al. | 528/486 |
| 2,914,516 | 11/1959 | Siggia | 528/486 |
| 3,017,393 | 1/1962 | Ney | 528/486 |
| 4,264,760 | 4/1981 | Meyer | 528/487 |
| 4,709,009 | 11/1987 | Fujiwara et al. | 528/486 |
| 4,795,802 | 1/1989 | Nuber et al. | 528/482 |
| 4,853,461 | 8/1989 | Chang et al. | 528/486 |
| 4,923,961 | 5/1990 | Vitands et al. | 528/482 |
| 5,078,913 | 1/1992 | Bennett | 528/487 |

Primary Examiner—Paul R. Michl
Assistant Examiner—LaVonda DeWitt
Attorney, Agent, or Firm—Walter Katz; Marilyn J. Maue; Joshua J. Ward

[57] ABSTRACT

A process is described for rendering amino-group polymer solutions substantially odorless. In one embodiment, a solution of the terpolymer of vinyl pyrrolidone, vinyl caprolactam and dimethylaminoethyl methacrylate is treated with 0.1–10% by weight of an acidic compound or an acidic ion-exchange resin to render the solution substantially odorless. Other vinyl pyrrolidone polymer solutions in water and alcohol are treated similarly with equally effective results.

9 Claims, No Drawings

PROCESS FOR RENDERING AMINO-GROUP-CONTAINING POLYMER SOLUTIONS SUBSTANTIALLY ODORLESS

BACKGROUND OF THE INVENTION

1. Field of the Invention

This invention relates to a process for purification of polymers, and, more particularly, to a method for rendering an amino-group-containing polymers substantially odorless by treatment with an acidic compound or resin.

2. Description of the Prior Art

Lorenz, in U.S. Pat. No. 4,521,404 described a polymeric hair preparation using a terpolymer of vinyl pyrrolidone (VP), vinyl caprolactam (VC) and dimethylaminoethyl methacrylate (DMAEMA). These terpolymers are sold commercially by International Specialty Products as Gaffix ® VC-713. However, often such products are plagued by an objectionable odor which limit their usefulness in the cosmetic and personal care industry.

Other commercial polymer solutions, such as copolymers of VP and (3-methacrylamidopropyl) trimethylammonium chloride (MAPTAC) or acrylamidopropyl trimethylammonium chloride, also have odor problems.

Accordingly, it is an object of this invention to provide a process for rendering amino-group-containing polymers substantially odorless.

SUMMARY OF THE INVENTION

A process is provided herein for treating a solution of an amino-group-containing polymer, e.g. vinyl pyrrolidone-containing polymers, which have objectional odors, with 0.1-10% by weight of an acidic compound or an acidic ion-exchange resin at 20°-70° C. for about 15 minutes to 24 hours to render the polymer product substantially odorless.

DETAILED DESCRIPTION OF THE INVENTION

In accordance with the invention, the terpolymer solution may be an aqueous, an organic-alcoholic, or an aqueous-alcoholic solution of the terpolymer. Treatment may be effected with an acid which is soluble in, or insoluble in the polymer solution, and the treated solution may be filtered to remove any insoluble material therein.

The invention will now be described in more detail with respect to the following examples.

EXAMPLE 1

A sample of an aqueous-alcoholic solution of Gaffix ® VC-713 terpolymer (International Specialty Products) had a strong, unpleasant, musty odor. The following acidic compounds thereby were added to this terpolymer product at a 10% w/w ratio. The resulting odor in the treated sample was evaluated after various time intervals. The results are shown in the Table below.

TABLE

| | Acidic Compound | Odor (next day) | Odor (1 year later) |
|---|---|---|---|
| A | Salicylic acid** | Odorless | Odorless |
| B | Citric acid | Odorless | Odorless |
| C | Carbopol 1342* | Odorless | Odorless |
| D | p-Toluenesulfonic acid | Substantially Odorless | Substantially Odorless |
| E | Dowex 50W-X8,H+** | Odorless | Odorless |

*Crosslinked polyacrylic acid
**Inhomogeneous system, can be easily decanted or filtered

EXAMPLE 2

The procedure of Example 1 was followed using an aqueous copolymer solution of vinyl pyrrolidone and (3-methacrylamidopropyl) trimethylammonium chloride (HS-100 - ISP) which had an objectionable odor initially, but, after treatment, was substantially odorless.

EXAMPLE 3

The procedure of Example 1 was followed using an alcoholic copolymer solution of acrylamidopropyl trimethylammonium chloride with similar results.

A pressure filter was filled with Dowex 50×8-100 sulfonic acid ion-exchange resin and connected to a 20 psi $N_2$ line. Then a mixture of 10 ml of the resin and 100 ml of a commercial sample of Gaffix ® VC-713 solution (ISP) having a strong odor was passed through the filter bed over a period of about 15-20 minutes (a) at room temperature, and (b) at 60° C. The thus-treated solutions then were observed to be substantially free of any odor as a result of contact with the acidic resin; and treatment of the terpolymer solution at room temperature gave a product which was completely odor-free.

While the invention has been described with particular reference to certain embodiments thereof, it will be understood that changes and modifications may be made which are within the skill of the art. Accordingly, it is intended to be bound only by the following claims, in which:

What is claimed is:

1. A method for producing a substantially odorless solution of a polymer selected from the group consisting of a terpolymer of vinyl pyrrolidone, vinyl caprolactam and dimethylaminoethyl methacrylate, a coploymer of vinyl pyrrolidone and (3-methacrylamidopropyl) trimethylammonium chloride, and a copolymer of vinyl pyrrolidone and acrylamidopropyl trimethylammonium chloride which comprises treating a solution of said polymer with 0.1-10% by weight of an acidic compound selected from the group consisting of a carboxylic acid, salicylic acid or citric acid, a sulfonic acid, p-toluenesulfonic acid, a crosslinked polyacrylic acid and a sulfonic acid ion-exchange resin at about 20°-70° C. for about 15 minutes to about 24 hours.

2. A method according to claim 1 wherein the treated terpolymer or copolymer solution is filtered to remove any insoluble material therein.

3. A method according to claim 1 wherein said terpolymer or copolymer solution is an aqueous, an organic-alcoholic, or an aqueous-alcoholic solution of the terpolymer.

4. A method according to claim 1 wherein said acid is a carboxylic acid or a sulfonic acid.

5. A method according to claim 1 wherein said acid is p-toluenesulfonic acid, salicylic acid, citric acid, or a crosslinked polyacrylic acid.

6. A method according to claim 1 wherein said acid is an acidic ion-exchange resin.

7. A method according to claim 1 wherein said treatment is carried out by passing the terpolymer or copolymer solution through an acidic ion-exchange resin.

8. A method according to claim 1 wherein said acid is salicylic acid

9. A method according to claim 1 wherein said acid is insoluble in said terpolymer or copolymer solution.

* * * * *